United States Patent [19]
Freeman et al.

[11] Patent Number: 5,660,427
[45] Date of Patent: Aug. 26, 1997

[54] HYBRID VEHICLE

[75] Inventors: Richard B. Freeman, Oxford; Jack J. Ritchie, Washington, both of Mich.

[73] Assignee: The Budd Company, Troy, Mich.

[21] Appl. No.: 397,974

[22] Filed: Mar. 3, 1995

[51] Int. Cl.$^6$ .................................................. B62D 33/00
[52] U.S. Cl. ...................... 296/190; 296/183; 296/197; 296/901
[58] Field of Search ..................................... 296/183, 190, 296/191, 193, 197, 901, 39.2, 70, 72; 180/89.12, 89.13, 89.19

[56] References Cited

U.S. PATENT DOCUMENTS

| | | |
|---|---|---|
| 4,352,520 | 10/1982 | Stiglmaier et al. . |
| 4,493,749 | 1/1985 | Brezina . |
| 4,711,467 | 12/1987 | Link et al. . |
| 4,730,870 | 3/1988 | DeRees . |
| 4,836,600 | 6/1989 | Miyazaki et al. . |
| 4,874,200 | 10/1989 | Nasu et al. . |
| 4,887,859 | 12/1989 | Aper . |
| 4,917,435 | 4/1990 | Bonnett et al. ......................... 296/901 |
| 4,944,612 | 7/1990 | Abstetar ................................. 296/39.2 |
| 4,976,490 | 12/1990 | Gentle . |
| 4,986,590 | 1/1991 | Patti et al. ............................. 296/39.2 |
| 5,042,395 | 8/1991 | Wackerle et al. . |
| 5,059,377 | 10/1991 | Ashton et al. . |
| 5,137,322 | 8/1992 | Muirhead . |
| 5,188,418 | 2/1993 | Walworth, Jr. et al. . |
| 5,228,742 | 7/1993 | Johnson et al. ........................ 296/183 |
| 5,297,836 | 3/1994 | Parry-Williams ....................... 296/901 |

FOREIGN PATENT DOCUMENTS

| | | |
|---|---|---|
| 0240470 | 7/1987 | European Pat. Off. . |
| 0444735 | 4/1991 | European Pat. Off. . |
| 2581951 | 11/1986 | France . |
| 1293225 | 11/1989 | Japan . |
| 2137938 | 10/1984 | United Kingdom . |
| 2207096 | 1/1989 | United Kingdom . |

*Primary Examiner*—Dean Kramer
*Attorney, Agent, or Firm*—Harness, Dickey & Pierce, P.L.C.

[57] ABSTRACT

A hybrid vehicle assembly, and more particularly, a hybrid truck assembly including a hybrid passenger cab shell and a hybrid truck box are disclosed. The hybrid passenger cab shell includes a first plurality panels which are assembled together to form an inner cab shell and a second plurality of panels which are assembled together to form an outer cab shell. Generally, at least one of the first or second pluralities of panels are formed from a plastic material such as a sheet molded compound (SMC). Similarly, the truck box portion of the vehicle is formed from a plurality of inner panels which are formed from a plastic material such as SMC and are assembled together along overlapping edge portions. Thereafter, a plurality of outer panels are attached to the respective inner panels.

28 Claims, 7 Drawing Sheets

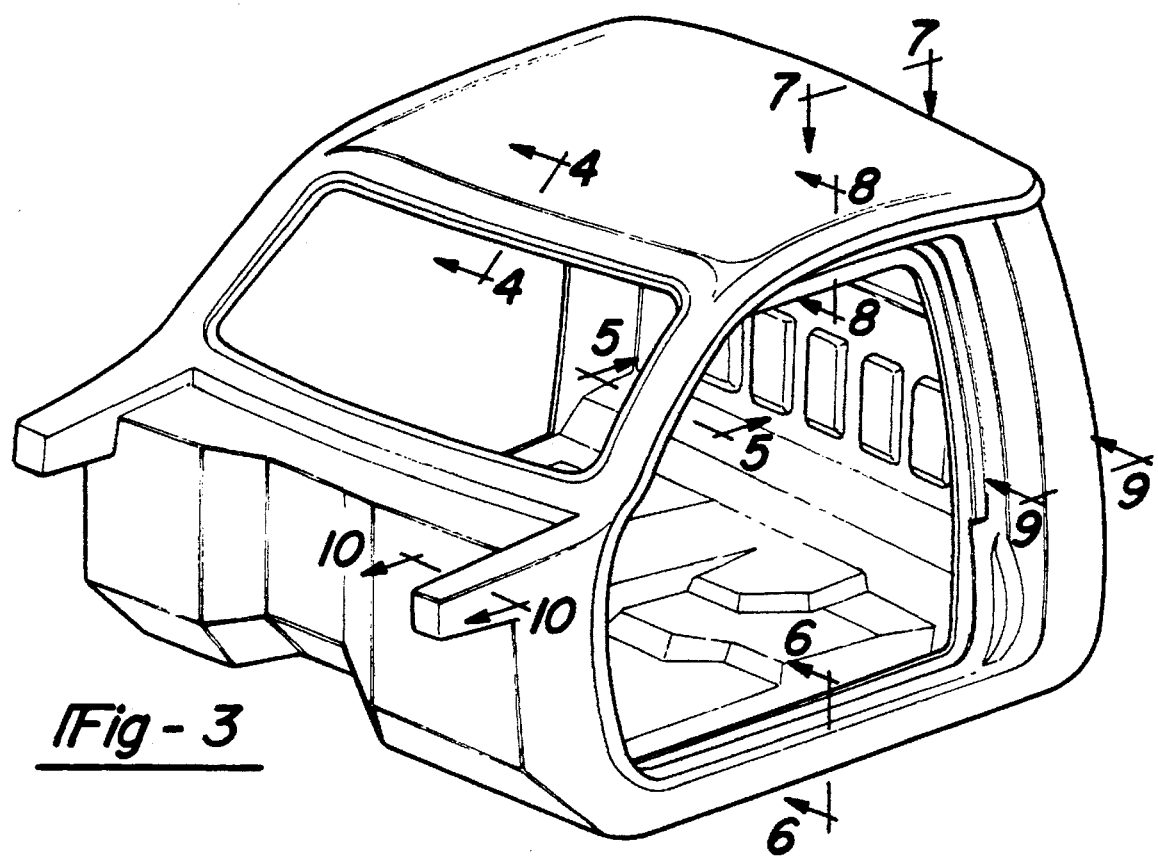
Fig-3
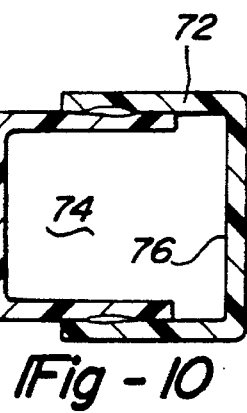
Fig-10
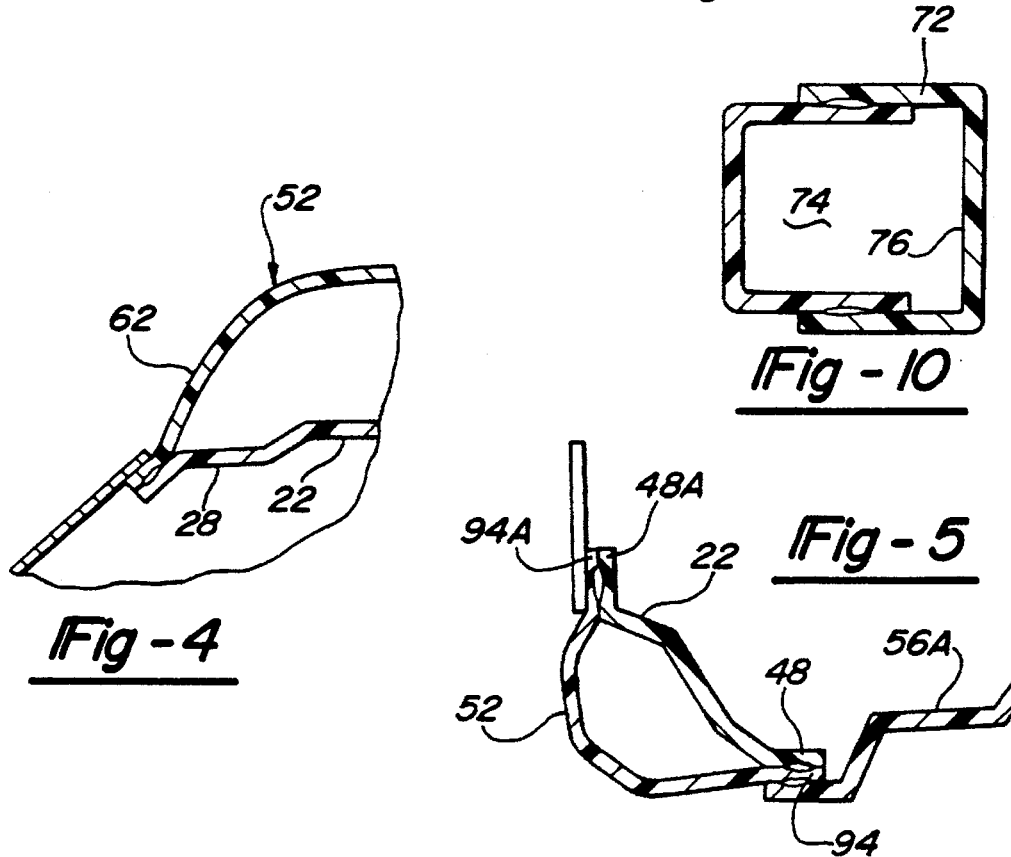
Fig-4
Fig-5

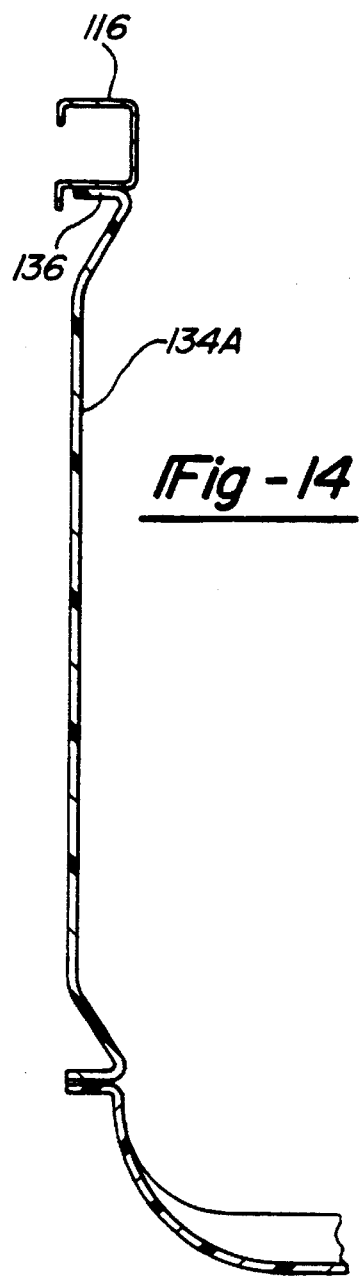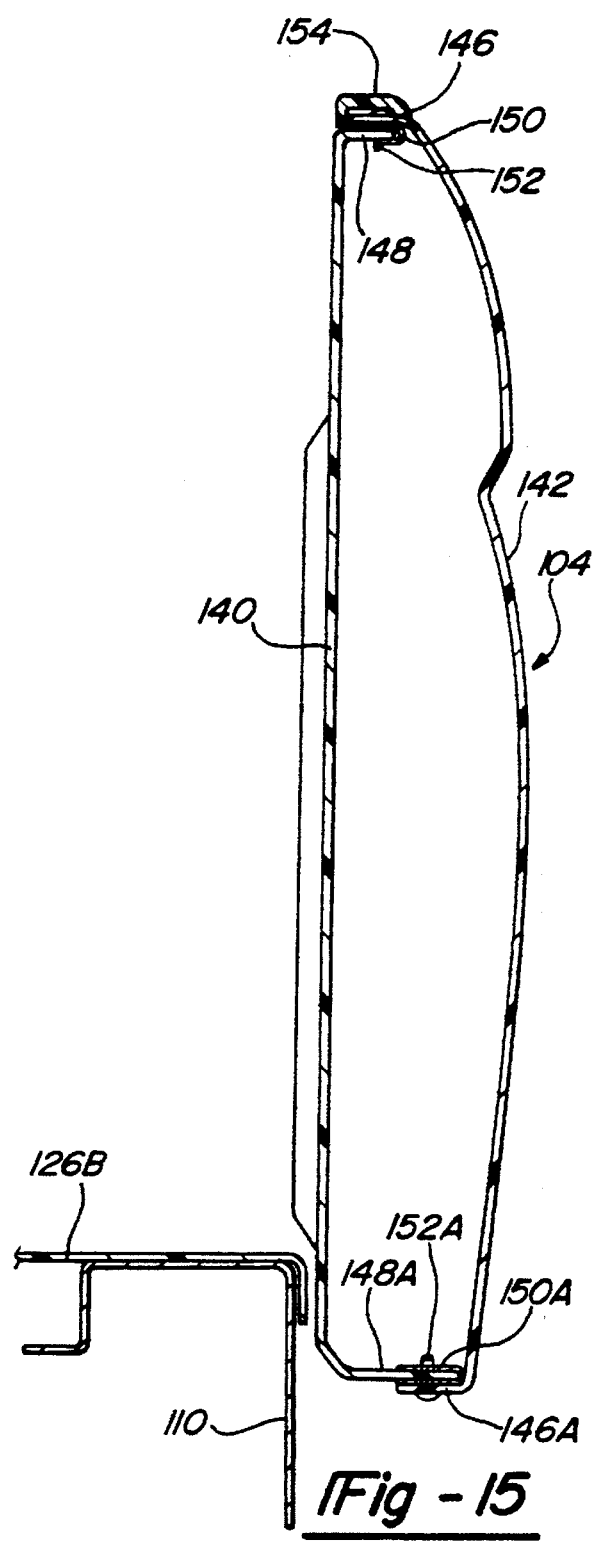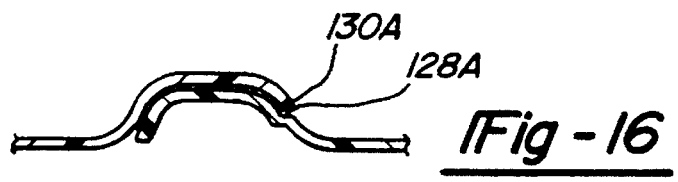

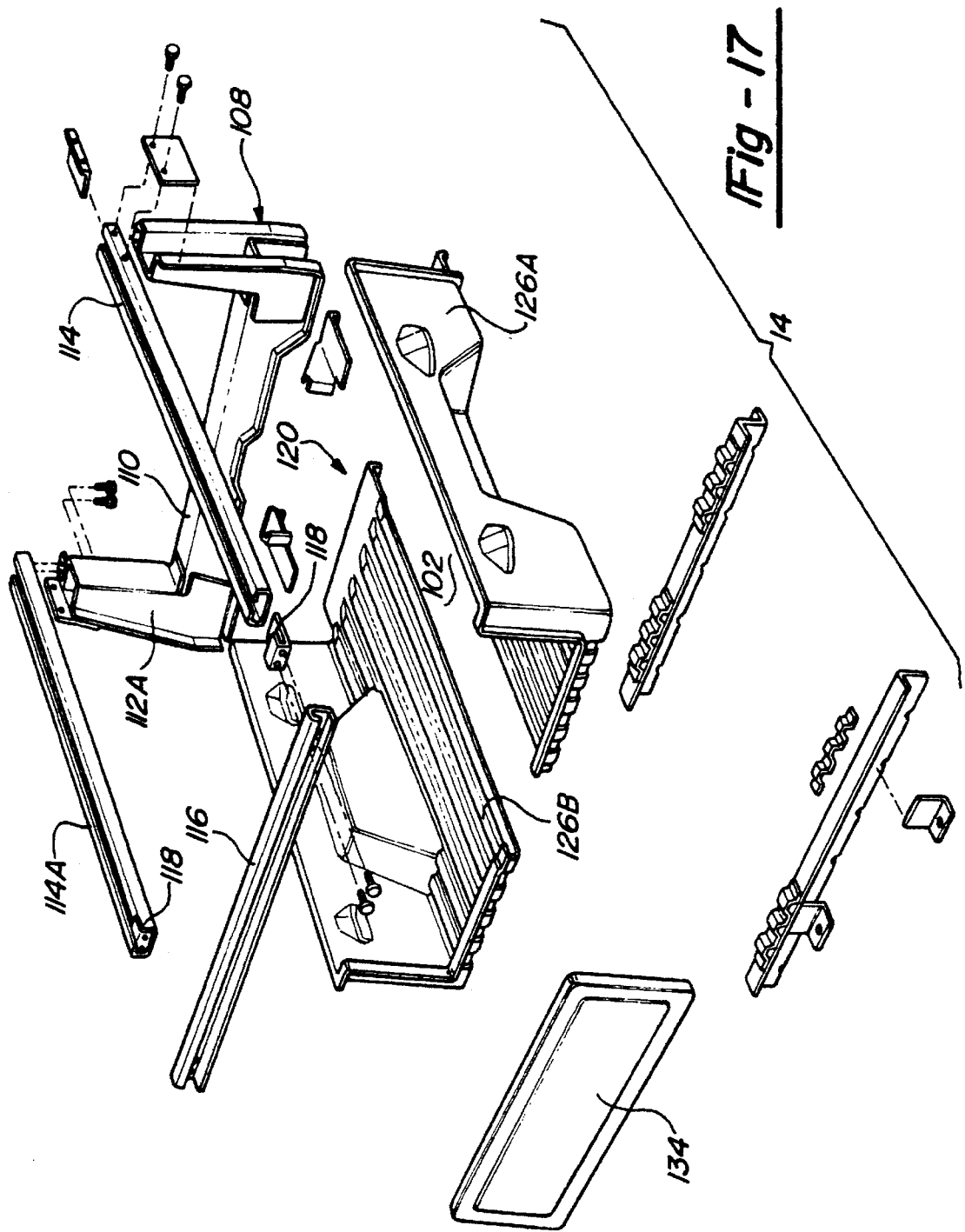

HYBRID VEHICLE

BACKGROUND OF THE INVENTION

I. Technical Field

This invention relates to a hybrid vehicle and, more particularly, to a hybrid truck assembly including both a hybrid cab portion and a hybrid bed portion.

II. Discussion

In the automobile industry, there has been a relatively recent trend towards limiting the overall weight of automotive vehicles. Automobiles which are lighter in weight tend to offer better fuel efficiency and often are less expensive to produce and manufacture. As a result of this trend, much attention has been given to reducing the weight of various vehicle components. For example, a number of automotive vehicles now employ lightweight vehicle body panels, including but not limited to, door panels, deck lids, body side panels, hoods, trunk lids and headliners, among others. Generally, the focus in the automobile industry has been on reducing the weight of individual components such as body panels and the like rather than on various larger vehicle systems.

The present invention is primarily concerned with providing a hybrid automotive vehicle which is relatively lightweight and structurally enhanced. Rather than being directed to individual components, the present invention is directed to the entire vehicle including a passenger cab shell and a truck box for a pickup truck.

The present invention is thus directed to providing a pickup truck which includes both a hybrid passenger cab or, more accurately, a hybrid passenger cab shell and a hybrid truck box. The hybrid pickup truck is lightweight, relatively inexpensive to produce and manufacture and is provided with enhanced load handling capabilities.

In addition to the benefits of weight reduction, other important advantages result from the use of plastic based materials, including but not limited to sheet molded compounds (hereinafter SMC) in the production of automotive vehicles as described herein. Plastic structures such as SMC structures can be modified in shape and thickness which makes them ideal for complex applications. Due to the moldability of SMC, the inner panels need not be full panels but can be sections of panels of different materials, including for example alternating sections of SMC and steel, depending on the structural requirements needed. Enhanced styling can be achieved by using SMC and combinations of SMC and steel since various inner panels can be married to different outer panels. Further, the styling benefits offered by SMC can be achieved at a relatively low tooling cost compared to all steel constructions.

Dimensional accuracy can also be realized due to the moldability of plastic structures such as SMC. This will result in assembly savings and will allow for the use of other components which require high dimensional accuracy. For example, the dimensional accuracy available using SMC allows for the production and use of one piece structures such as wrap-around hood and hybrid steel/SMC doors which will not have to be adjusted to fit within the vehicle door opening, as is common with steel intensive structures.

The present invention also offers numerous advantages by providing a hybrid truck box. As with standard truck boxes, the truck box of the present invention is defined by a frame assembly, a bed portion and a tailgate. The bed portion which includes the sidewalls and floor, ideally will be made from a plastic material such as SMC. By utilizing SMC, the truck box portion offers improved dent and corrosion resistance and elimination of the need for add on truck bed liners as are now commonly used by truck owners. Additionally, numerous model variations are possible due to the inherent moldability of SMC. Fasteners which are normally exposed in steel truck beds can be molded in or countersunk to improve the aesthetic characteristics of the pickup truck. Most importantly, the hybrid truck box of the present invention also contributes to a significant reduction in vehicle weight as compared to all steel designs.

By way of example, the bed assembly of a 1993 Ford Ranger short box pickup truck excluding the tailgate and fender weighs approximately 122 lbs. In contrast, the hybrid truck bed assembly of the present invention having substantially identical dimensions weighs approximately 98.0 lbs. Thus, an average weight savings of 24.0 lbs. in the bed portion alone can be achieved. By way of further example, the average weight of the fender and fender housing of the 1993 Ford Ranger short box pickup truck is approximately 77.5 lbs. wherein a similarly dimensioned hybrid fender and fender housing manufactured in accordance with the teachings of the present invention weighs approximately 56.0 lbs. on average. An average weight savings of 21.5 lbs. is therefore achieved with the hybrid fender and fender housing portion of the hybrid vehicle. Lastly, the all steel tailgate assembly of the 1993 Ford Ranger short box pickup weighs approximately 32.5 lbs., while the tailgate assembly of the present invention weighs approximately 23.5 lbs. an average of 9.0 lbs. less. All dimensions being substantially equal, there is a total truck box weight savings of approximately 54.5 lbs. under the present invention as compared to a 1993 Ford Ranger short box pickup with substantially identical dimensions.

SUMMARY OF THE INVENTION

In accordance with the teachings of the present invention, a hybrid vehicle, and more particularly, a hybrid pickup truck assembly is provided which includes both a hybrid passenger cab shell and a hybrid truck box. Preferably, the passenger cab shell includes an SMC, steel or combined SMC and steel inner panel assembly and an SMC outer body panel assembly. Generally the inner panel assembly and outer body panel assembly are provided with flanged edges for ease in assembling the structure.

Ideally, the inner panel assembly and outer body panel assembly have numerous contoured overlapping surfaces to assist in maintaining the structural integrity of the passenger cab as a whole. To assemble the passenger cab shell the panels of the outer body assembly are primarily fastened to the inner panels through the use of highly sheer resistant adhesives which are commercially available from a number of sources. Additionally, mechanical fasteners such as nut and bolt assemblies, clips and numerous other fasteners can be utilized as supplemental fastening means.

With regard to the hybrid pickup truck box, the truck box includes a frame assembly, a bed portion and a tailgate portion. The bed portion includes multiple inner and outer panels with the inner panels generally being formed from SMC or SMC/steel composites which are adhesively bonded together and attached to the frame assembly. Thereafter, the tailgate is pivotally attached to the truck bed portion to complete the truck box assembly.

BRIEF DESCRIPTION OF THE DRAWINGS

The various advantages of the present invention will become apparent to those skilled in the art after having the

Figure 1:
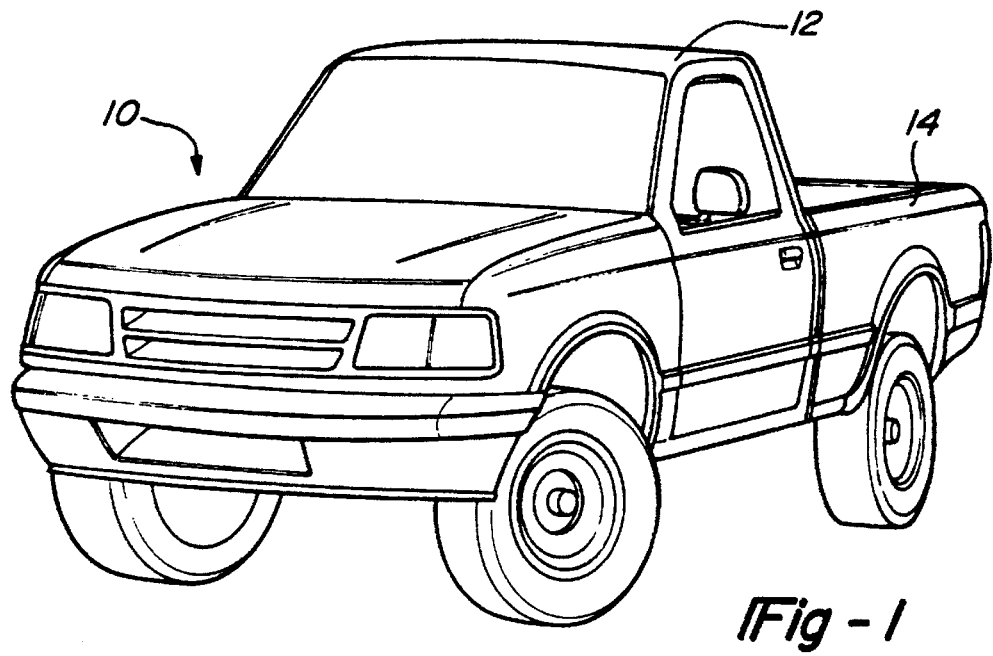
Figure 2:
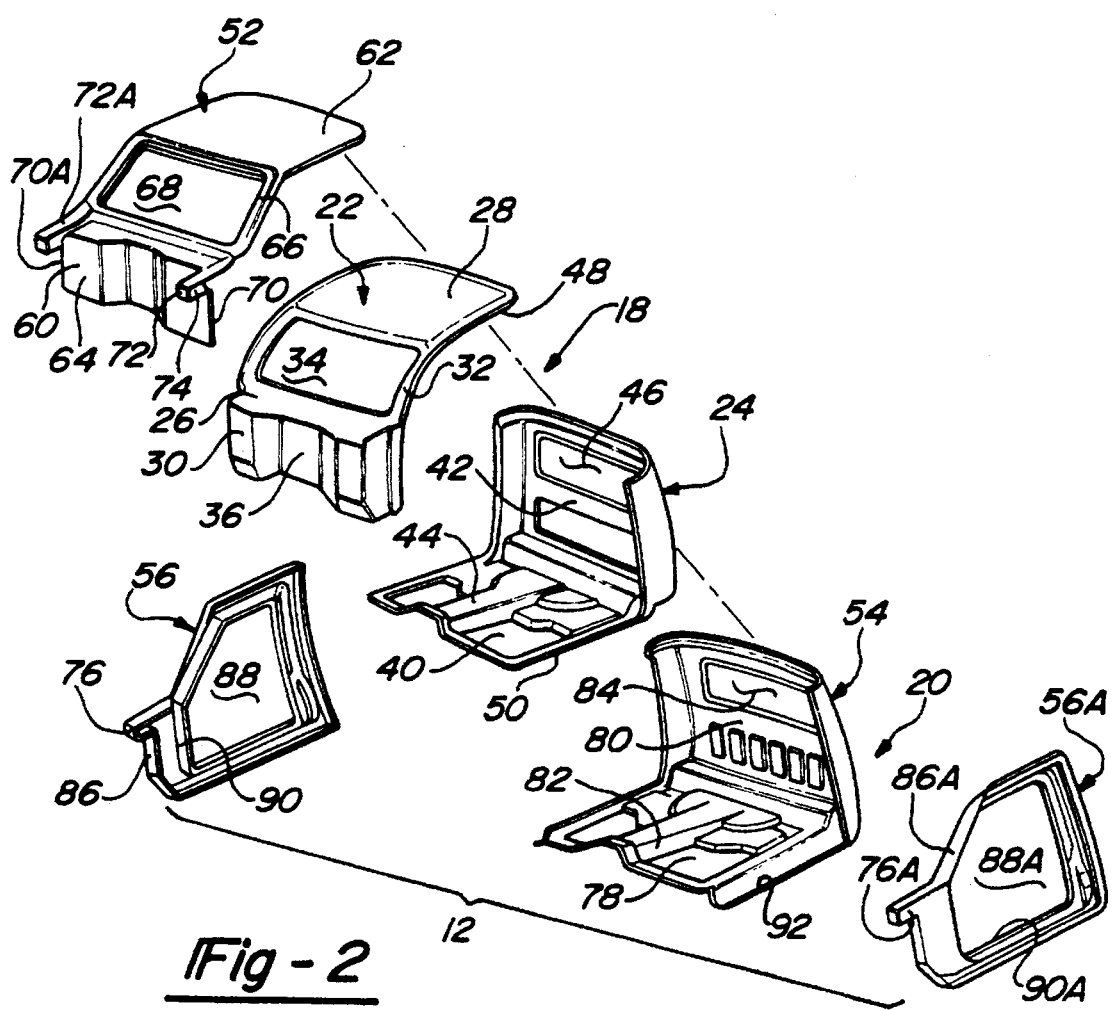
Figure 6:
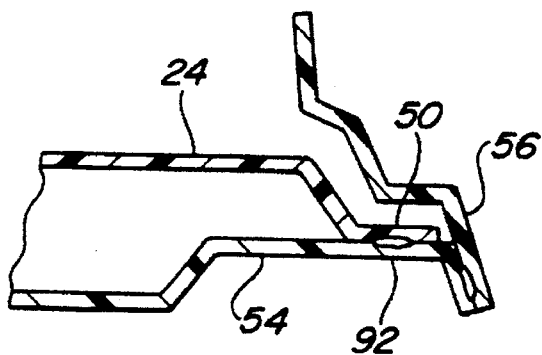
Figure 7:
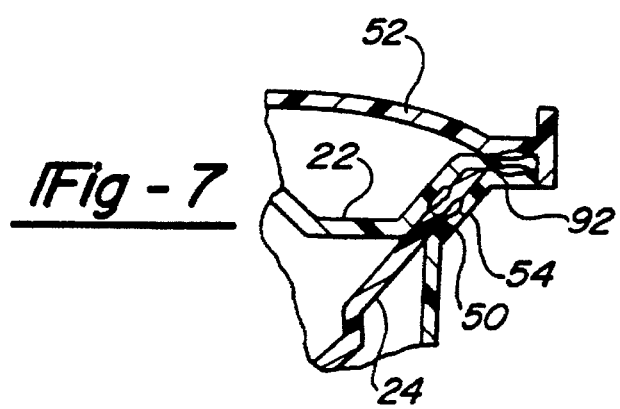
Figure 8:
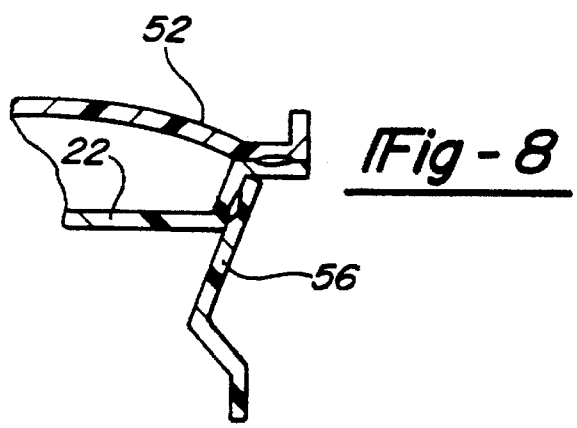
Figure 9:
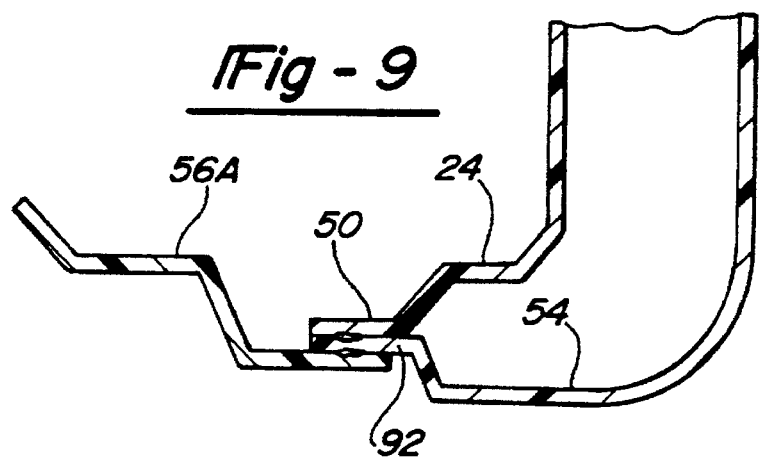
Figure 11:
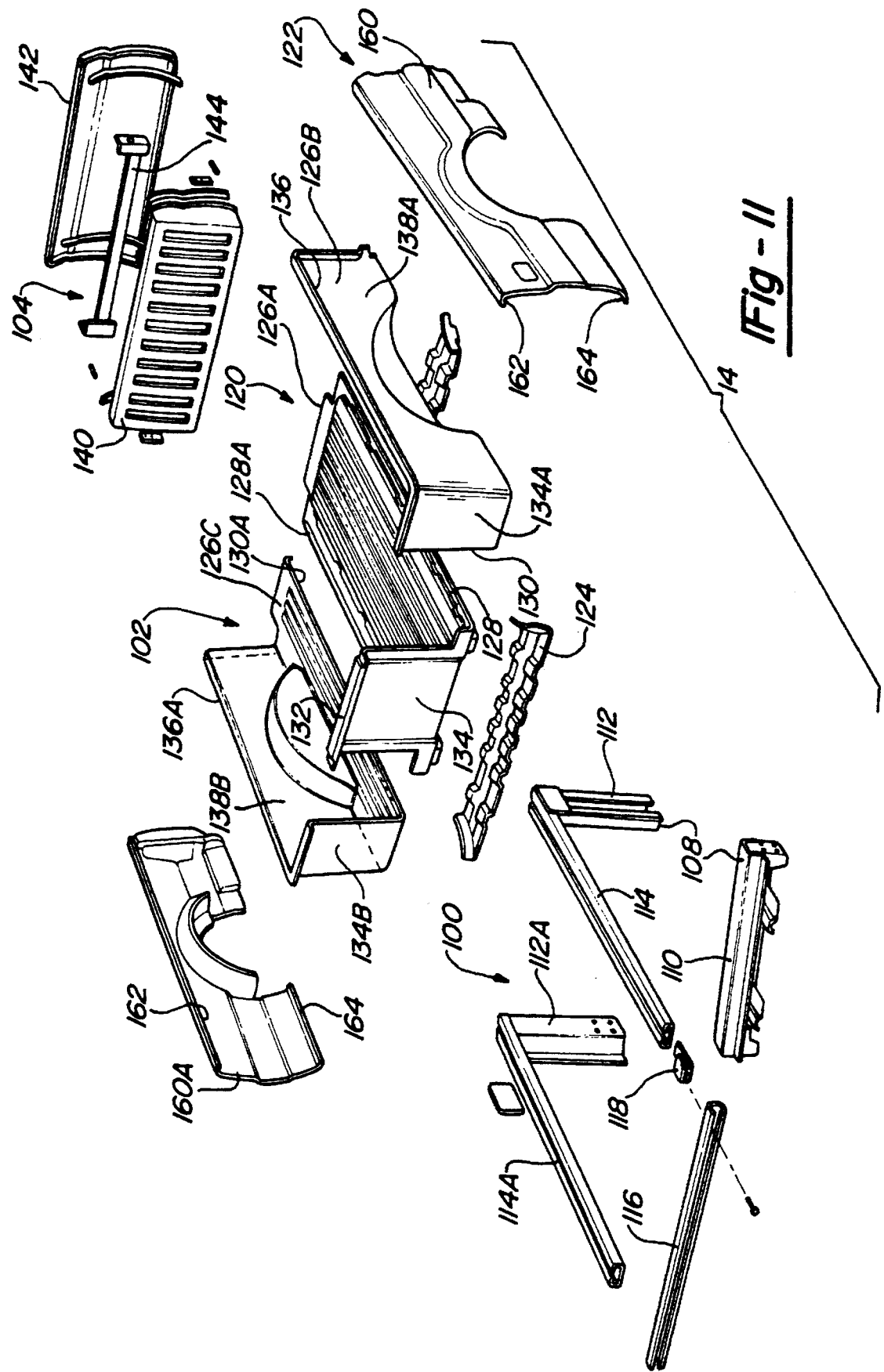
Figure 12:
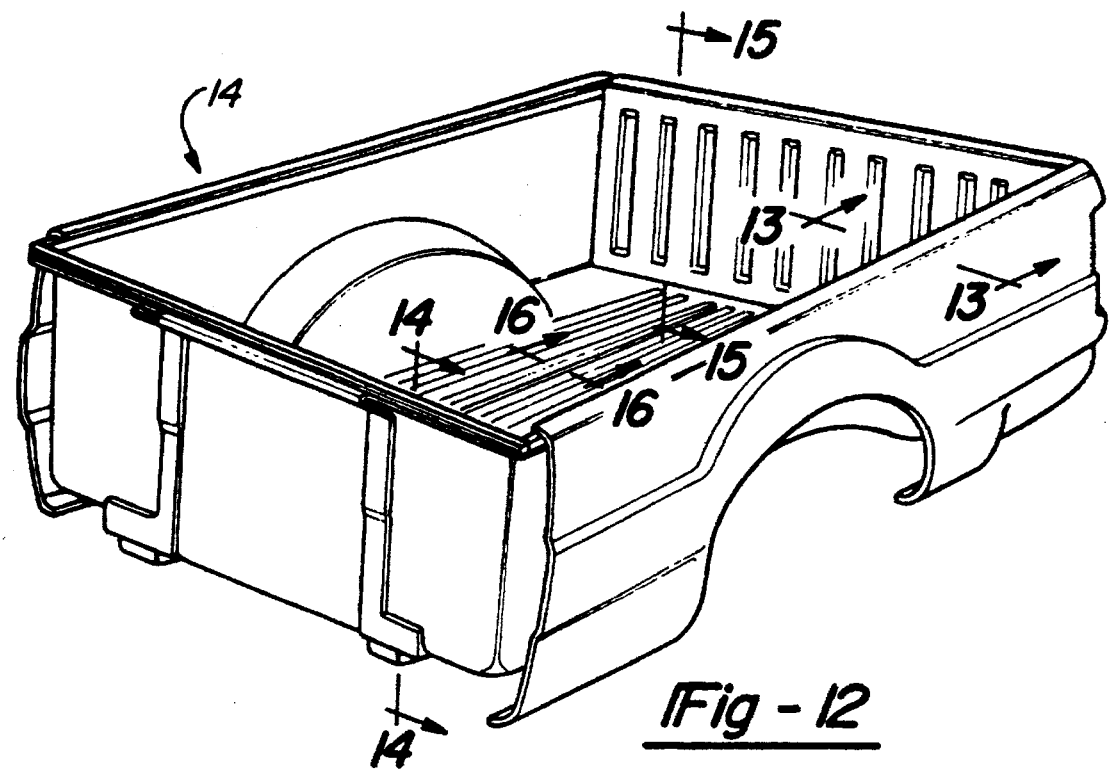
Figure 13:
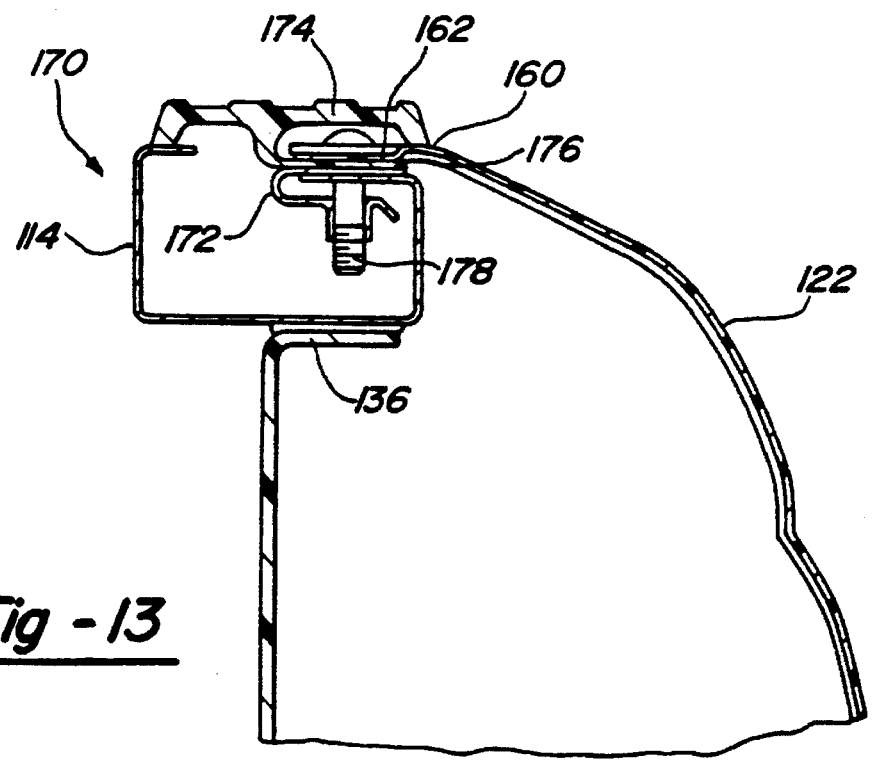

3 benefit of reading the following specification and by reference to the drawings in which:

FIG. 1 is a perspective view of a pickup truck assembly according to the teachings of the present invention;

FIG. 2 is an exploded perspective view of the pickup truck cab shell according to the teachings of the present invention;

FIG. 3 is a perspective view illustrating the assembled pickup truck passenger cab shell of FIG. 2;

FIG. 4 is an enlarged fragmentary sectional view taken along line 4—4 of FIG. 3;

FIG. 5 is an enlarged fragmentary sectional view taken along line 5—5 of FIG. 3;

FIG. 6 is an enlarged fragmentary sectional view taken along line 6—6 of FIG. 3;

FIG. 7 is an enlarged fragmentary sectional view taken along line 7—7 of FIG. 3;

FIG. 8 is an enlarged fragmentary sectional view taken along line 8—8 of FIG. 3;

FIG. 9 is an enlarged fragmentary sectional view taken along line 9—9 of FIG. 3;

FIG. 10 is an enlarged fragmentary sectional view taken along line 10—10 of FIG. 3;

FIG. 11 is an exploded perspective view of the hybrid truck box according to the teachings of the present invention;

FIG. 12 is an assembled view of the truck box assembly of FIG. 11;

FIG. 13 is an enlarged fragmentary sectional view taken along line 13—13 of FIG. 12;

FIG. 14 is an enlarged fragmentary sectional view taken along line 14—14 of FIG. 12;

FIG. 15 is an enlarged fragmentary sectional view taken along line 15—15 of FIG. 12;

FIG. 16 is an enlarged fragmentary sectional view taken along line 16—16 of FIG. 12; and FIG. 17 is an assembled view of an alternative preferred truck box embodiment.

DETAILED DESCRIPTION OF THE PREFERRED EMBODIMENT

The methods and various embodiments of the present invention are directed to a hybrid vehicle, and more particularly, to a pickup truck including a hybrid cab shell assembly and a hybrid truck box assembly. From the outset, it should be understood that while the present invention will hereinafter be described with reference to a pickup truck other applications such as flat bed trucks for example are considered to be within the scope of the present invention.

Referring to FIG. 1 a perspective view of a pickup truck 10 including a passenger cab 12 and a truck box assembly 14 is provided. The passenger cab 12 preferably includes a shell as shown in FIGS. 2 through 9 having an inner reinforcing assembly 18 and an outer body assembly 20. The inner reinforcing assembly 18 preferably includes a first panel 22 and a second panel 24. The first panel 22 includes a forward wall portion 26 and an integral headliner portion 28 extending substantially perpendicularly from the forward wall portion. The forward wall portion 26 includes a lower longitudinally disposed wall 30 and an upper section 32 including a windshield opening 34. As illustrated in FIGS. 2 and 3 the lower wall 30 often includes a recessed portion 36 extending back toward the passenger compartment to provide room for engine compartment components (not shown).

4

The second panel 24 of the inner reinforcing member 18 typically includes a floor board portion 40 and an integrally attached longitudinally extending rear wall 42. The floor board portion 40 includes an upwardly projecting laterally extending hump 44 underneath which the drive shaft (not shown) runs to the rear of the vehicle. The rear wall 42 also includes a rear window opening 46. Preferably, both the first and second panels include flanged edges 48 and 50, respectively, disposed about the periphery to assist in forming a mating relationship with the outer body assembly 20. As noted previously, the inner reinforcing assembly 18 can be made from steel, SMC or a combination of steel and SMC.

With respect to the outer body assembly 20, the outer body assembly 20 typically includes a first panel 52, a second panel 54, and two door opening panels 56 and 56A, respectively which encapsulate the inner reinforcing assembly 18 as shown in FIGS. 3–9. Generally, the first and second panels of the outer body assembly are designed to have substantially the same shaped convolutions provided on the respective first and second panels of the inner body assembly. For example the first panel 52 includes a lower wall 60 having a lower longitudinally disposed forward wall 64 and an upper section 66 including a windshield opening 68 and a roof portion 62. Extending along each longitudinal edge 70 and 70A of the first panel 52 generally at the junction of the lower longitudinal wall 64 and the upper section 66 are arms 72 and 72A for attaching the truck front structure (not shown). In addition to providing an attachment point for mounting the truck front structure, the extending arms 72 and 72A are provided with detents 74 for receiving the arms 76 and 76A of the door opening panels 56 and 56A respectively. Preferably, the lower walls and headliners of the first outer panel overlap the lower wall and headliner of the first inner panel such that they are substantially contiguous.

The second panel 54 of the outer body assembly 20 also typically includes a floor board portion 78 and an integrally attached longitudinally extending rear wall 80. The floor board portion 78 is provided with a laterally extending hump 82 which fits within the hump portion 44 of the inner panels floor board portion 40. Likewise the rear wall 80 of the second panel 54 includes a rear window opening 84.

As previously noted, the first and second door opening panels 56 and 56A are provided with arms 76 and 76A which extend transversely along the leading edges 86 and 86A respectively, and fit securely within the detents 74 provided on the extending arms of the first outer panel 52 as illustrated more clearly in FIG. 10. The door opening panels 56 and 56A also include enlarged openings 88 and 88A defined by inwardly projecting peripheral flanges 90 and 90A for mounting the vehicle doors during later stages of the vehicle production process. Ideally, the door openings 88 and 88A include flanges (not shown) extending into the openings for receiving weatherstripping as is commonly used in the automobile manufacturing industry. Under a highly preferred embodiment the first and second panels 52 and 54 and the two door opening panels 56 and 56A are made from an SMC material.

Assembly of the pickup truck passenger cab shell as illustrated in FIG. 3 will now be described in greater detail. Under a first method of manufacturing, the passenger cab shell is either robotically or manually assembled by adhesively bonding the second inner panel 24 to the second outer panel 54.

As illustrated in FIGS. 6, 7 and 9 adhesive is applied along the peripheral edge 50 of the second inner panel 24 or the peripheral edge 92 of the second outer panel 54, or both and the two panels are brought together to be bonded. Once the first and second panels are bonded together, the door opening panels are bonded to the outer panel 54 as illustrated in FIGS. 6 and 9.

Thereafter, the first inner and outer panels 22 and 52 are bonded together and applied to the remainder of the preassembled cab shell. As with the second inner and outer panels, an adhesive is applied along the peripheral edges 48 of the first inner panel 22, the peripheral edge 94 of the first outer panel 52, or both, as well as along the corresponding window aperture edges to bond the first inner and outer panels together. Once the first inner and outer panels are bonded together they are bonded to the previously assembled second inner and outer panels such that the panes of window glass and vehicle doors can be attached and the entire passenger cab shell fastened to the vehicle chassis (not shown).

Referring now to FIGS. 11 and 17, the hybrid truck box portion of the present invention will now be described in greater detail. The truck box assembly 14 according to the teachings of the present invention generally includes a frame assembly 100, a bed portion 102 and a tailgate assembly 104. The frame assembly 100 typically includes a substantially U-shaped brace 108 including a transverse cross-member 110 disposed along the rear portion of the truck box which may be welded or adhesively assembled as shown in FIG. 17 or mechanically fastened as illustrated in FIG. 11. The frame assembly 100 also typically includes first and second laterally spaced rails 114 and 114A which are attached along one end to the upwardly extending legs 112 and 112A of the U-shaped brace and a transversely extending rail 116 which is coupled to the first and second laterally spaced rails via coupling members 118 along a second end. The frame assembly 100 is generally attached to the vehicle chassis (not shown) as is known in the art.

The bed portion 102 of the truck box portion generally includes a multiple piece SMC inner panel assembly 120, a multiple piece outer panel assembly 122 and support brackets 124. As illustrated in FIGS. 11 and 12 under a first truck box embodiment the inner panel assembly 120 includes a first inner panel 126A, a second inner panel 126B and a third inner panel 126C. The first panel 126A is provided with flanged lateral edges 128 and 128A, respectively for hosting the corresponding lateral edges 130 and 130A of the second and third panels in an overlapping manner as shown with regard to edges 128A and 130A in FIG. 16. Preferably, the first inner panel 126A will include an outward, transversely projecting top edge 132 located along the front wall 134 and likewise the second and third panels 126B and 126C will include outward, transversely projecting edges 136 and 136A, respectively, located along the front walls 134A, 134B and side walls 138A, 138B to assist in attaching the inner body panels together as illustrated in FIG. 14 through the use of adhesives and/or mechanical fasteners.

The outer panel assembly 122 as shown in FIG. 11 generally includes outer body panels 160 and 160A disposed along each side of the bed portion 102. The outer body panels 160 and 160A which can be made from either metallic or plastic materials preferably have inwardly extending flanges 162 and 164 along the top and bottom edges thereof which allow the panels to be press-fit onto the inner body panels 126B and 126C, respectively. Upon initial attachment of the outer body panels to the inner body panels, the two can be more permanently attached through the use of adhesives and/or mechanical fasteners as illustrated in more detail in FIG. 13.

Under the attachment structure 170, the frame rail 114 is adhesively attached over the flange 136. Thereafter, a plurality of retainer clips 172 having apertures therethrough are positioned over the frame rail and a trim strip 174 having a tail portion 176 disposed between the top of the retainer clips and the undersurface of the outer body panel 160 is attached by the fastener 178. Upon tightening the fasteners 178, the outer body panel becomes fixedly attached over the flange 136 of the inner body panel 126B. As will be understood by those skilled in the art, the same type of attachment structure is employed along both sides of the box portions.

The vehicle truck box embodiment shown in FIG. 17 is substantially similar to the embodiment illustrated with regard to FIG. 11, in that the truck box assembly of FIG. 17 includes a frame assembly 100, a bed portion 102 and a tailgate assembly 104, as shown in FIG. 11. The bed portion differs, however, in that the inner body panel assembly 120 includes only two panels, i.e. inner body panels 126A and 126B. Additionally, the front wall 134 which extends to the inner body panels 126A and 126B, is a separately attachable component instead of an integral piece as in the embodiment of FIG. 11. Again, preferably the outer body panels (not shown) can be press-fit over the inner body panels for at least temporary attachment.

With regard to the tailgate assembly 104 of the truck box assembly 14, generally the tailgate assembly includes an inner panel 140, an outer panel 142 and any one of a number of commercially available reinforcement members 144. Referring particularly to FIG. 15, as illustrated it is generally preferred that the upper and lower edges 146 and 146A of the outer panel 142 overlap the upper and lower edges 148 and 148A of the inner panel 140 for aesthetic purposes. U-shaped clips 150 and 150A are utilized to secure a plurality of fasteners 152 and 152A disposed along the length of the tailgate to secure the inner and outer panels together. Additionally, a trim piece 154 is generally provided along the top edge of the tailgate 104 to limit wear and tear. Once assembled the tailgate 104 can be hingely attached along its lower edge to the truck box frame cross member 110 in a known manner. As with the truck bed portion 102, the outer panel 142 and optionally the inner panel 140 are formed from an SMC material which also contributes to a reduction in the overall weight of the vehicle over conventional all steel designs.

As should be clearly understood by those skilled in the art, the relatively simplistic construction of the hybrid vehicle of the present invention makes it an ideal candidate for highly automated assembly processes which in turn tend to assist in lower production cost. Therefore, not only does the hybrid vehicle of the present invention tend to lower the costs associated with the operation of the vehicle in terms of fuel economy, but also, the hybrid vehicle offers significant potential for reduced manufacturing costs as well.

Still other advantages will become apparent to those skilled in the art after having the benefit of a study of the specification, drawings and the following claims.

What is claimed is:

1. An automotive vehicle, comprising:
    a hybrid passenger cab shell including a first plurality of panels which are joined to form an inner reinforcing assembly and a second plurality of panels which are joined to form an outer body assembly which encapsulates said inner reinforcing assembly in a substantially contiguous manner, wherein at least one of said first or second pluralities of panels are formed from a durable plastic material.

2. The automotive vehicle of claim 1, wherein said inner reinforcing assembly includes a first inner panel having a floor portion and an upwardly extending integral rear wall portion and a second inner panel having a forward wall portion and an integral vehicle roof headliner portion.

3. The automotive vehicle of claim 1, wherein said outer body assembly includes a first outer panel having a floor portion and an upwardly extending integral rear wall portion and a second outer panel having a forward wall portion and an integral vehicle roof headliner portion.

4. The automotive vehicle of claim 3, wherein said second outer panel includes first and second laterally spaced apart arms having means for supporting said vehicle door panels.

5. The automotive vehicle of claim 1, wherein said hybrid passenger cab shell further comprises a plurality of door openings along which vehicle door panels are attached.

6. The automotive vehicle of claim 1, wherein said inner reinforcing assembly and said outer body assembly further include mating, flanged edges about the periphery thereof along which said inner reinforcing assembly and outer body assembly are adhesively bonded together.

7. The automotive vehicle of claim 1, wherein said first plurality of panels and said second plurality of panels include mating contoured surfaces.

8. The automotive vehicle of claim 1, wherein said durable plastic material is a sheet molding compound.

9. A pick-up truck style automotive vehicle including a box portion, comprising:
   a frame assembly, a bed portion which is supportable by said frame assembly, said bed portion including an inner panel structure formed from a plurality of panels each having an edge portion along which said panels are attached to define a multiple piece floor assembly, said plurality of panels including one or more panels made from a durable plastic material having an integral side wall extending upwardly therefrom and a multiple piece outer panel structure including side walls which are attached to said inner panel structure.

10. The automotive vehicle of claim 9, wherein said inner panel structure defining said floor assembly includes at least two panels each having a longitudinal edge portion which partially overlaps a corresponding panel such that the panels are adjoined along the edge portions.

11. The automotive vehicle of claim 10, wherein said inner panel structure further includes at least two plastic panels each of which include outwardly extending flanges over which an outer panel is fittingly attached.

12. The automotive vehicle of claim 9, wherein said durable plastic material is a sheet molding compound.

13. The pick-up truck style automotive vehicle of claim 9, wherein said plurality of panels are adhesively attached along said edge portion.

14. The pick-up truck style automotive vehicle of claim 9, wherein said frame assembly comprises a frame rail including a trim strip assembly disposed thereon, said trim strip assembly including a body portion and a tail extending from the body portion which is entrapped between an inwardly extending flange on said outer body panel and said frame rail to assist in mounting the trim strip over said frame rail.

15. The pick-up truck style automotive vehicle of claim 14, wherein said frame assembly further includes a plurality of retainer clips having an aperture therethrough for receiving a fastener whereby said retainer clips and said fastener assist in maintaining the attachment of said outer panel to said frame rail.

16. An automotive vehicle of the truck variety, comprising:

a hybrid passenger cab assembly including a first plurality of panels which are joined to form an inner reinforcing assembly, a second plurality of panels which are joined to form an outer body assembly, said outer body assembly which encapsulates the inner reinforcing assembly by overlaying at least a portion of said inner reinforcing assembly in a substantially contiguous manner, and a plurality of door opening panels, wherein at least one of said first or second pluralities of panels are formed from a durable plastic material; and a hybrid box portion including a frame assembly, a bed portion which is supportable by said frame assembly, said bed portion including an inner panel structure formed from a plurality of panels each having an edge portion along which said panels are attached, said plurality of panels including one or more panels made from a durable plastic material and a multiple piece outer panel structure including side walls which are attached to said inner panel structure.

17. The automotive vehicle of claim 16, wherein said inner reinforcing assembly includes a first inner panel having a floor portion and an upwardly extending integral rear wall portion and a second inner panel having a forward wall portion and an integral vehicle roof headliner portion.

18. The automotive vehicle of claim 16, wherein said outer body assembly includes a first outer panel having a floor portion and an upwardly extending integral rear wall portion and a second outer panel having a forward wall portion and an integral vehicle roof headliner portion.

19. The automotive vehicle of claim 18, wherein said second outer panel includes first and second laterally spaced apart arms having means for supporting said plurality of door opening panels.

20. The automotive vehicle of claim 16, wherein said inner reinforcing assembly and said outer body assembly further include mating, flanged edges about the periphery thereof along which said inner reinforcing assembly and outer body assembly are adhesively bonded together.

21. The automotive vehicle of claim 16, wherein said first plurality of panels and said second plurality of panels include mating contoured surfaces.

22. The automotive vehicle of claim 16, wherein said durable plastic material of said passenger cab assembly and said box portion is a sheet molding compound.

23. The automotive vehicle of claim 16, wherein said inner panel structure of said bed portion includes at least two panels each having a longitudinal edge portion which partially overlaps corresponding panels such that the panels are adjoined along the edge portions.

24. The automotive vehicle of claim 23, wherein said inner panel structure further includes at least two plastic panels each of which include outwardly extending flanges over which an outer panel is fittingly attached.

25. The automotive vehicle of claim 16, wherein said frame assembly comprises a frame rail including a trim strip assembly disposed thereon, said trim strip assembly including a body portion and a tail extending from the body portion which is entrapped between an inwardly extending flange on said outer body panel and said frame rail to assist in mounting the trim strip over said frame rail.

26. The automotive vehicle of claim 25, wherein said frame assembly further includes a plurality of retainer clips having an aperture therethrough for receiving a fastener whereby said retainer clips and said fastener assist in maintaining the attachment of said outer panel to said frame rail.

27. An automotive vehicle of the truck variety including a bed portion comprising:

a frame assembly including a substantially U-shaped brace including upwardly extending legs and elongated rails attached to said upwardly extending legs;

a bed portion which is supported by said frame assembly including an inner panel assembly and an outer panel assembly, said inner panel assembly which is formed from a durable plastic material includes a plurality of panels having an edge portion which partially overlaps a corresponding panel such that the panels are ajoined along said edge portion and upwardly extending side walls having an outwardly extending flange disposed along a top edge thereof for supporting said elongated rails, said outer panel assembly includes a plurality of panels attached to said elongated rail and over a corresponding inner panel; and a plurality of substantially U-shaped retaining clips for fastening said outer panel assembly to said elongated rails to attach said outer panel assembly over said upwardly extending side walls of said inner panel assembly.

28. The pick-up truck style automotive vehicle of claim 27, further comprising a trim strip assembly disposed on said elongated rail, said trim strip assembly including a body portion and a tail extending from said body portion which is entrapped between an inwardly extending flange on said outer panel assembly and said elongated rails to assist in mounting said trim strip assembly over said elongated rails.

* * * * *